Patented Sept. 3, 1946

2,406,990

UNITED STATES PATENT OFFICE 2,406,990

ANTIFUNGUS WRAPPER, ETC.

George C. Borden, Jr., and Karl R. Karlson, Easton, Pa., assignors to Riegel Paper Corporation, New York, N. Y., a corporation of New Jersey No Drawing. Application November 17, 1944, Serial No. 563,988

6 Claims. (Cl. 117—154)

This invention relates to anti-fungus wrappers, etc. and more particularly to coated paper, with the coating carrying a high boiling, volatile anti-mycotic agent which will slowly vaporize over a prolonged period of time.

The new anti-fungus wrapper is of particular value for use in wrapping foodstuffs such as loaves of bread to prevent or inhibit the growth of molds and fungi.

The economic loss caused by the growth of fungi and molds upon the varied products of many industries is well known. One of the most familiar examples is that of bread mold, particularly under wartime and other conditions where unsold bread may not be returned by the retailer or where bread is otherwise kept for some time before sale or use.

The present invention provides an improved anti-fungus wrapper well adapted for use in wrapping food products and other products whereby the wrapped article is given increased protection against molds and fungi.

According to the present invention an anti-fungus wrapper is made by incorporating in the coating of coated paper a high boiling, volatile anti-mycotic agent which will but slowly vaporize and which will continue to vaporize for a considerable period of time and the vapors of which will prevent or inhibit the growth of molds or fungi.

The paper which is used in making the new anti-fungus wrapper may be such common types of wrapping paper ar glassine or Cellophane, coated with moistureproof coatings. Different kinds of paper and different lacquers or coating compositions can be used in making the new anti-fungus wrappers but the lacquer or coating composition should be one with which the anti-mycotic agent is compatible and which permits the slow and gradual vaporization of the high boiling anti-mycotic agent.

Where the paper is coated with the lacquer or with a hot-melt coating at a relatively high temperature the anti-mycotic agent will in general have a boiling point above that of the temperature used in the coating process. The coating of the paper may be a surface coating or may saturate the paper. Advantageously a heat-sealing lacquer is used although with lacquers which are non-heat-sealing a sealed package can be formed by applying heat-sealing materials at the time of packaging or to the packaged article. With coated paper, coated with a heat-sealing lacquer, and with heat-sealing of the wrapper after applying it to the article, a sealed package is formed with the wrapped article protected by the vaporized anti-mycotic agent. Similarly, if non-heat-sealing lacquers are used for coating paper, heat-sealing agents may be applied at the time of wrapping or subsequent thereto to form a sealed package in which the wrapped article is similarly protected.

In forming the new anti-fungus wrapper, the high boiling anti-mycotic agent is incorporated in the compatible lacquer in amount sufficient to give effective anti-fungus action. The lacquer or coating is then applied to coat or impregnate the paper according to usual methods of applying such lacquers or coatings, e. g., by the hot melt method or by using lacquers containing the moistureproofing constituents in a volatile solvent. An advantageous embodiment of the invention is in connection with the use of moistureproof heat-seal lacquers for coating glassine or Cellophane for food packaging to give coated sheets which will not only have moistureproofness but sheets which may be sealed together by the application of heat. Another advantageous embodiment of the invention is in connection with what is known as non-heat-seal lacquers which give good vaporproofness of the coated glassine or Cellophane but where an application of glue or additional plasticizer or other substance may be added before the heat is applied for heat-sealing in forming a sealed package of the wrapped article.

Nitrocellulose lacquers are advantageously used with the anti-mycotic agents in making the new ani-fungus wrappers. A moistureproof heat-seal lacquer may thus be formed of nitrocellulose together with resin, plasticizer, wax and solvent in suitable proportions to form a heat-seal lacquer using, e. g., one-half second nitrocellulose (80% dry) with a suitable compatible resin such as ester gum, a suitable plasticizer or plasticizers such as dibutyl phthalate, a wax such as paraffin wax, and a solvent composed of ethyl acetate and toluol, for example, in the following proportions:

| | Per cent |
|---|---|
| Nitrocellulose | 11 |
| Resin | 5 |
| Plasticizer | 7 |
| Paraffin wax | 1 |
| Solvent | 76 |

The composition of such a heat-sealing lacquer can be varied. Similarly non-heat-seal types of lacquers may be used containing somewhat different proportions of the ingredients, for example, the following proportions:

| | Per cent |
|---|---|
| Nitrocellulose | 11 |
| Resin | 10 |
| Plasticizer | 3 |
| Paraffin wax | 10 |
| Solvent | 75 |

With such a non-heat-seal type of lacquer which is lower in plasticizer, additional plasticizer may be added during the sealing operation so that the lacquer will act as a cement on the application of heat.

Such nitrocellulose lacquers are well adapted for use for the coating of paper or films for the moisture-protection and preservation of foods.

The anti-mycotic agents used in the lacquers are high boiling agents which vaporize but slowly but which in the vapor state are effective anti-mycotic agents. These are used in substantial amounts such that a prolonged action is obtained. The anti-mycotic agents which we have found particularly advantageous are the dialkyl dichloro succinates. The dimethyl dichloro succinate is somewhat more effective than the diisopropyl dichloro succinate. The diethyl dichloro succinate has somewhat similar properties. These dialkyl dichloro succinates which are manufactured and sold, e. g., as dimethyl dichloro succinate, etc. are the alkyl esters of alpha-beta dichloro succinic acid having the general formula R.COO.CHCl.CHCl.COO.R, where R represents the alkyl group.

These anti-mycotic agents may be used in varying amounts, for example, in amount equal to around 1% to 2% or somewhat more of the coating composition used for coating the paper. These dialkyl dichloro succinates are compatible with nitrocellulose lacquers such as those above mentioned and have the further advantage of acting as plasticizers although they are not primarily relied upon as plasticizers. Since only a small quantity is ordinarily used along with the main plasticizers of the coating a gradual vaporization of the volatile anti-mycotic agents does not unduly reduce the plasticizing effect of the main plasticizers used. As an example of the use of such an anti-mycotic agent with nitrocellulose lacquer such as those above mentioned, it has been found that 2% of dimethyl dichloro succinate was sufficient to give a coated paper effective anti-mold properties. Ordinarily from 1 to 2% of the anti-mycotic agent based on the solids of the lacquer will be sufficient but somewhat larger amounts may be used to obtain a more prolonged or effective action.

In general, the nitrocellulose lacquer or the lacquer-wax or hot melt composition used for coating the paper will contain oil or lacquer solvents in which the anti-mycotic agents are soluble and the agents will be held in the coating in a releasable form permitting their slow but gradual volatilization over a period of time.

Glassine and greaseproof papers as well as plain sulfite papers have been coated with nitrocellulose lacquers and hot melt coatings containing the anti-mycotic agents and have been found effective in protecting bread wrapped therewith, greatly prolonging the period of time during which the bread was kept fresh and soft and free from objectionable mold and fungus growth.

The effectiveness of the new anti-fungus wrappers appears to be due to the gradual vaporization of the anti-mycotic agent and is thereby distinguished from wrappers which depend upon contact of the wrapped article with the wrapper to protect the wrapped article.

Improved results have been obtained in the preservation of wrapped bread even where the wrapper was not heat-sealed. Freshly baked bread has been wrapped in the new anti-fungus wrapper and stored at a temperature of around 100° F. and 90-95% relative humidity for periods of as long as a week or more in comparison with bread similarly wrapped with wrappers which did not contain the anti-mycotic agent with the result that the bread wrapped in the new anti-fungus wrapper was kept soft and fresh and free from visible mold long after the bread wrapped in the ordinary wrapper had been rendered useless by mold.

The present invention provides a simple and inexpensive and practical method of inhibiting the growth of molds and fungi on bread and other food as well as on products of other industries by providing an improved wrapper for wrapping the article, the anti-mycotic agent contained in the paper coating volatilizing and exerting its anti-mycotic action over prolonged periods of time. The heat-sealing of the wrapped article in a heat-sealed moistureproof wrapper is particularly advantageous in that the wrapped article is not only protected from outside contamination but is subjected to an atmosphere within the wrapper into which the anti-mycotic agent vaporizes and in which it exerts its anti-mycotic action over prolonged periods of time.

We claim:

1. An anti-fungus wrapper made of moisture-resistant coated paper, having as an effective high boiling anti-mycotic agent a small percent of a lower dialkyl dichloro succinate incorporated in the coating, said anti-mycotic agent slowly vaporizing over a prolonged period of time.

2. An anti-fungus wrapper made of moisture-resistant coated paper, coated with a moisture-resistant nitrocellulose lacquer, said coating having as an effective high boiling anti-mycotic agent a small percent of a lower dialkyl dichloro succinate incorporated in the coating, said anti-mycotic agent slowly vaporizing over a prolonged period of time.

3. An anti-fungus wrapper made of moisture-resistant coated paper, coated with a heat-sealing coating composition, said composition having as an effective high boiling anti-mycotic agent a small percent of a lower dialkyl dichloro succinate incorporated in the coating, said anti-mycotic agent slowly vaporizing over a prolonged period of time.

4. An anti-fungus wrapper made of moisture-resistant coated paper, having about 1 to 2% of a lower dialkyl dichloro succinate incorporated in the coating.

5. An anti-fungus wrapper made of moisture-resistant coated paper, having about 1 to 2% of dimethyl dichloro succinate incorporated in the coating.

6. An anti-fungus wrapper made of moisture-resistant coated paper, coated with a moisture-resistant nitrocellulose lacquer, said coating having about 1 to 2% of a lower dialkyl dichloro succinate incorporated in the coating.

GEORGE C. BORDEN, Jr.
KARL R. KARLSON.

Disclaimer 2,406,990.—*George C. Borden, Jr.*, and *Karl R. Karlson*, Easton, Pa. ANTIFUNGUS WRAPPER, ETC. Patent dated Sept. 3, 1946. Disclaimer filed Apr. 1, 1949, by the assignee, *Riegel Paper Corporation*.

Hereby enters this disclaimer to claims 1, 3, 4, and 5 of said patent.

[*Official Gazette May 10, 1949.*]